United States Patent
Cao et al.

(10) Patent No.: US 10,613,526 B2
(45) Date of Patent: Apr. 7, 2020

(54) DRONE AND CONTROL DEVICE AND COMMUNICATION PORT DEVICE THEREOF

(71) Applicant: HEX Technology Limited, Hong Kong (HK)

(72) Inventors: Muqing Cao, Xiamen (CN); Chengjun Wu, Xiamen (CN)

(73) Assignee: HEX Technology Limited, Hong Kong (HK)

( * ) Notice: Subject to any disclaimer, the term of this patent is extended or adjusted under 35 U.S.C. 154(b) by 0 days.

(21) Appl. No.: 16/013,973

(22) Filed: Jun. 21, 2018

(65) Prior Publication Data

US 2018/0373237 A1    Dec. 27, 2018

(30) Foreign Application Priority Data

Jun. 27, 2017    (CN) .................... 2017 2 0757034 U

(51) Int. Cl.

| G05D 1/00 | (2006.01) |
|---|---|
| H04L 12/00 | (2006.01) |
| H04L 12/40 | (2006.01) |
| B64D 41/00 | (2006.01) |
| B64C 39/02 | (2006.01) |
| B64D 43/00 | (2006.01) |
| B64D 47/00 | (2006.01) |

(52) U.S. Cl.
CPC .......... *G05D 1/0011* (2013.01); *B64C 39/024* (2013.01); *B64D 43/00* (2013.01); *B64D 47/00* (2013.01); *H04L 12/00* (2013.01); *B64C 2201/146* (2013.01); *B64D 2041/002* (2013.01); *H04L 2012/40215* (2013.01)

(58) Field of Classification Search
CPC ...... G05D 1/0016; G05D 1/0011; G05D 1/02; G05D 1/101; B64D 2041/002; H04L 12/40; H04L 29/10; H05K 7/1459; H05K 5/02

See application file for complete search history.

(56) References Cited

U.S. PATENT DOCUMENTS 5,581,130 A  * 12/1996 Boucheron ......... B60R 16/0238
                                                                307/10.1
2008/0038942 A1* 2/2008 Gordon ............... B60R 16/0315
                                                                439/76.2

\* cited by examiner

*Primary Examiner* — Abby Y Lin
*Assistant Examiner* — Renee LaRose
(74) *Attorney, Agent, or Firm* — Idea Intellectual Limited; Margaret A. Burke; Sam T. Yip

(57) ABSTRACT

This invention comprises a control device and a communication port device applied to drone, and a drone using such devices. The control device comprises a carrier board and a main control board that is detachably configured on the carrier board, said main control board is electrically connected with the carrier board, and the carrier board is configured with an interface device in which connections between a plurality of kinds of external devices with said carrier board are established. The carrier board is mainly used for connection with other external electronic devices and power distribution, and the main control board is responsible for processing sensor data and delivering control information. The main control board and the carrier board are connected through a single interface to enable a data transmission. The communication port device is configured on the drone flight controller.

9 Claims, 2 Drawing Sheets

DRONE AND CONTROL DEVICE AND COMMUNICATION PORT DEVICE THEREOF

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to China Patent Application No. 201720757034.4 filed Jun. 27, 2017; the disclosure of which is incorporated herein by reference in its entirety.

TECHNICAL FIELD

This invention relates to the technical field of drone equipment, particularly to a control device, a communication port device and a drone using the control device and the communication port device.

BACKGROUND

Drone flight controllers require cabled communication with external devices to obtain and deliver information. At present, the electronic components of drones on the market are divided into the following categories: flight controllers, electronic speed controllers, motors, and other sensors such as GPS, cameras etc. The flight controller is the brain of a drone, responsible for processing the information from each sensor and delivering major control commands. The flight controller delivers control signals to the electronic speed controller, then the electronic speed controller controls the speed of the motor. Flight controllers on the market typically include a main processing chip, microelectromechanical systems (MEMS) sensors and interfaces for connection with other external electronic devices. In practical use, a common flight controller will connect with a number of electronic devices, such as electronic speed controller, GPS, camera etc. The drone flight controller uses external interfaces to communicate with other external devices. A communication protocol corresponds to an independent external interface, such as PWM, CAN, serial ports etc. Conventionally, the external interface usually adopts the JST-GH or DF13 interface.

At present, because flight controllers on the market require cabled connections to communicate with other electronic devices during use, a number of cables will be connected to the flight controller, resulting in complex cabling. The existing tightly-arranged external interfaces lead to excessive numbers of cables during use, resulting in cluttered cables easily causing installation and troubleshooting difficulties. Meanwhile, the drone flight controller itself does not have a reliable way to attach to the drone rack, and it is usually fixed with double-sided tape, so it is inevitable that there is a risk of it falling off during the flight. Moreover, it is not convenient for the user to replace the flight controller when there are excessive cables. If the user wants to upgrade the flight controller, cables are required to be unplugged for replacement, which is inconvenient. With respect to the above problem, no effective solution has yet been proposed.

SUMMARY OF THE INVENTION

The invention provides a control device to solve the problem that the cabling of the existing drone flight controller is complicated and the replacement of the flight controller is inconvenient due to connection with a number of kinds of electronic devices.

To achieve the above purposes, the invention provides a control device. The control device according to the invention comprises a carrier board and a main control board that is detachably configured on the carrier board, the main control board is electrically connected with the carrier board, and the carrier board is configured with an interface device which allows a plurality of external devices to be connected with the carrier board.

Further, a slot is configured on the carrier board, and the main control board is detachably configured in the slot. Further, a data connector is configured on the carrier board, a data interface is configured on a position of the main control board corresponding to the data connector, and the data connector is connected to the data interface. Further, the data connector includes power supply pins, so that the carrier board supplies power to the main control board when the data connector is connected to the data interface. Further, the side of the carrier board is configured with at least one power interface for connecting an external power source, so that the carrier board and the main control board are powered by an external power source. Further, the interface device includes a bus interface and an output interface, and the interface device further includes at least one of a remote-control interface, a GPS interface, a telemetry interface and an analog digital signal conversion interface. Further, the bus interface includes at least one of a CAN bus interface, an I2C bus interface and an USB interface. Further, the output interface includes at least one of a PWM interface, a PPM interface and a S.BUS interface.

In another aspect of this invention, a drone employing the aforesaid control device is also provided. The drone according to this invention is characterized in that the drone is provided with the aforesaid control device. Further, the control device is detachably mounted on the drone.

Another purpose of this invention is to reduce the number of drone flight controller cables connected to the external devices, and improve the stability of the connection between the drone flight controller and the external devices.

To achieve the purpose, this invention provides a communication port device for mounting on the drone flight controller. In one embodiment of present invention, the communication port device is a DF17 connector, and the DF17 connector is provided with screw holes and screws that match the screw holes. The DF17 connector is secured to the drone using the screws and screw holes, one end of the DF17 connector is connected to the main control board, and the other end is connected to the carrier board. The DF17 connector reduces the number of connection cables between the drone flight controller and the external devices, and the DF17 connector can be fixed onto the drone using its screw holes and screws, thus improving the connection stability.

Further, the DF17 connector is an 80-pin connector. Further, the number of screw holes is 4 and the screw holes are arranged at the four vertices of the DF17 connector respectively, and the four screw holes are rectangular. The evenly-arranged four screw holes ensure uniform stress throughout the DF17 connector when the DF17 connector is secured to the drone.

In various embodiments of present invention, other compatible connectors known in the art may also be used with the communication port to achieve the above objectives.

In various embodiments of this invention, the device connection portion is separated from the data processing portion of the flight controller, and the carrier board is connected with the external devices. The main control board is only responsible for processing data and delivering control information, and the main control board is detachably connected with the carrier board, so that the user only needs to simply replace the main control board during the upgrade of the flight controller, without the need for re-cabling, thereby solving the problem of complicated cables and inconvenience of replacement of the flight controller due to connection of a plurality of electronic devices to existing drone flight controllers. The above technical solution reduces the number of cables on the drone flight controller for connection with various external devices and provides the stability of the connection between the external interfaces and the drone flight controller.

BRIEF DESCRIPTION OF THE DRAWINGS

To explain more clearly the embodiments of this invention or technical solutions in the prior art, the drawings in the embodiments will be briefly described as below. The drawings in the following description are only exemplary embodiments for a further understanding of this invention, from which the other features, objects and advantages of this invention will become more apparent. The drawings of the illustrative embodiments of this invention and their description are used to explain this invention and do not constitute improper limitations to this invention. For those skilled in the art, other embodiments may also be derived from these drawings. Among the drawings.

DETAILED DESCRIPTION OF THE PREFERRED EMBODIMENTS

Figure 1:
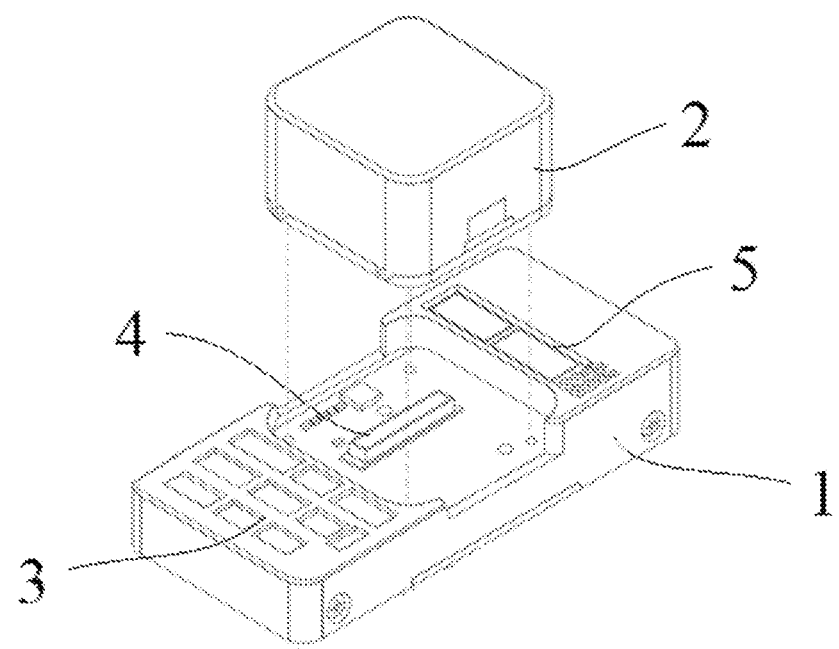
FIG. 1 is a schematic diagram of the control device of the first embodiment.
Figure 2:
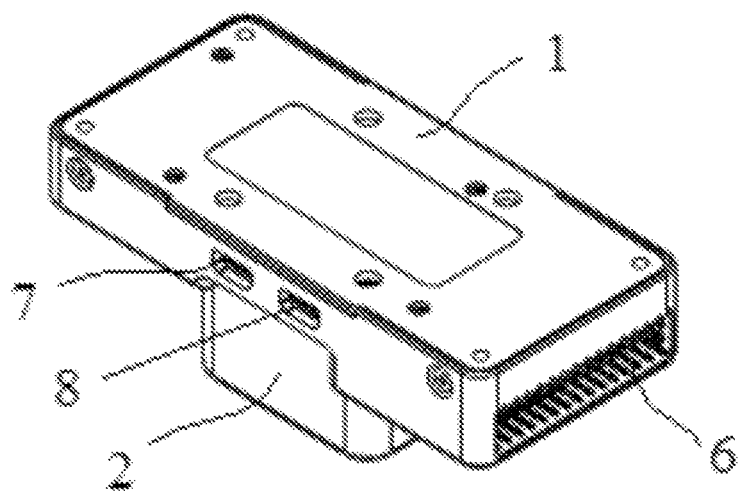
FIG. 2 is a schematic diagram of the control device of the second embodiment.

To enable those skilled in the art to better understand this invention, the technical solutions in the embodiments of this invention will be described clearly and completely in combination with the drawings in the embodiments of this invention. The embodiments described herein are part of this invention but not exhaustive. Based on the embodiments of this invention, all other embodiments obtained by those of ordinary skill in the art without making creative efforts shall fall within the protection scope of this invention.

It should be noted that the terms "first", "second" and the like in the specification, claims and the above drawings of this invention are used to distinguish similar objects and are not necessarily used to describe a specific sequence or order of priorities. It should be understood that such data may be interchanged as appropriate for the embodiments of this invention described herein. In addition, the terms "include" and "comprise" and any variations thereof are intended to cover non-exclusive inclusions. For example, a process, a method, a system, a product or a device that comprises a series of steps or units is not necessarily limited to those steps or units clearly listed but may also include other steps or units not explicitly listed or inherent to such process, method, product or device.

In this invention, the orientations or positional relationship indicated by the terms "upper", "lower", "left", "right", "front", "back", "top", "bottom", "inner", "outer", "middle" and the like are based on the orientations or positional relationship shown in the drawings. These terms are primarily for purposes of better describing this invention and its embodiments, and are not intended to limit the devices elements or components to a particular orientation or to limit their construction and operation in a particular orientation.

In addition, some of the above terms may be used to indicate other meanings besides orientation or positional relationship. For example, the term "upper" may also be used to indicate a certain attachment relationship or connection relationship in some cases. Those of ordinary skill in the art can understand the specific meanings of these terms in this invention according to specific circumstances.

In addition, the terms "installation", "disposed", "connection" and "connected" should be interpreted broadly. For example, it may be a fixed connection, detachable connection or integral configuration; it may be a mechanical connection or electrical connection; it may be a direct connection, or indirect connection through an intermediate medium, or an internal connection between two devices or elements or components. Those of ordinary skill in the art can understand the specific meanings of the above terms in this invention according to specific circumstances.

It should be noted that the embodiments in this invention and the features in the embodiments can be combined with each other in the absence of conflict. This invention will be described in detail below with reference to the drawings and in combination with the embodiments.

As shown in FIG. 1, this invention relates to a drone flight controller. The flight controller comprises a carrier board 1 and a main control board 2. The main control board 2 is detachably configured on the carrier board 1. The data transmission between the carrier board 1 and the main control board 2 is realized through the data connector 4. The carrier board 1 is configured with a plurality of interface devices 3 for connecting different external electronic devices, so as to transmit the data sent from the external electronic device to the main control board 2, and the control signal sent from the main control board 2 is sent to each electronic device.

As shown in FIG. 1, in an optional embodiment of this invention, the carrier board 1 has a rectangular structure, the main control board 2 is a controller block, and both the carrier board 1 and the main control board 2 adopt a plastic material shell. A slot is configured in the middle of the carrier board 1, and the main control board 2 is locked in the slot. A data connector 4 is configured in the middle of the slot. When the main control board 2 is locked in the slot, the data interface on the main control board 2 is just inserted into the data connector 4, thus realizing data transmission between the carrier board 1 and the main control board 2. In this invention, only one data interface is used for data transmission between the carrier board 1 and the main control board 2, which is convenient for connection and facilitates the replacement of the main control board 2. In an optional embodiment of this invention, the data connector 4 adopts a DF17 interface device.

As shown in FIG. 1, in an optional embodiment of this invention, the main control board 2 is locked into the slot of the carrier board 1, and the carrier board 1 and the main control board 2 are fixed by 4 screws. Meanwhile, as the data connector 4 uses a DF17 interface device, the DF17 interface device also plays a role of fixation.

In this embodiment, no power supply device is provided on the carrier board 1 and the main control board 2. Therefore, an external power supply device is required to supply power to the carrier board 1 and the main control board 2. As shown in FIG. 1, two power interfaces 5 are configured on the top side of the carrier board 1 for connecting external power devices. In an optional embodiment of this invention, the power interfaces 5 can connect 5V external power devices.

In this invention, the main control board 2 is powered by the carrier board 1, the data connector 4 of the carrier board 1 further includes a plurality of power supply pins, and the data interface of the main control board 2 also includes a power supply pin interface. When the data interface of the main control board 2 is plugged into the data connector 4 of the carrier board 1, the carrier board 1 can supply power to the main control board 2 through the power pins on the data connector 4. In an optional embodiment of this invention, the data connector 4 uses a DF17 interface device, and the DF17 interface device includes a plurality of power pins.

As shown in FIG. 1, a plurality of interface devices 3 for connecting different external electronic devices are provided on the outside of the carrier board 1. As there are many types of drones, the electronic devices configured thereon are also different. To prevent waste of the interfaces and reduce the weight of the flight controller, various kinds of carrier boards 1 of the control device can be selected to adapt to different drones. For example, when the user's drone has no GPS device, a smaller carrier board 1 without a GPS interface can be selected when selecting a carrier board 1, so as to lower the weight of the flight controller.

In an optional embodiment of this invention, the top side of the carrier board 1 is configured with various kinds of bus interfaces, including two CAN bus interfaces, two I2C bus interfaces and one USB interface for connecting different external electronic devices.

The side of the carrier board 1 is also configured with a plurality of output interfaces, such as a S.BUS interface configured on the top side of the carrier board 1 and a PWM interface 6 configured on a side of the carrier board 1, which are used to deliver control signals to multiple motors or other electronic devices of the drone.

In addition, multiple kinds of interfaces for connecting external devices are also configured on the carrier board 1 in this embodiment, such as a remote-control interface (TELEM interface) for accessing remote control signals, a telemetry interface (Spektrum interface) for accessing telemetry signals, a GPS interface for accessing GPS signals, and an analog digital signal conversion interface.

In this embodiment, the side of the carrier board 1 is further configured with a USB interface 7 for USB communication with other devices on the carrier board 1, and a debug interface 8 for receiving debug signal.

In this invention, the main control board 2 mainly includes a processing chip and a MEMS sensor. A Micro-USB interface for data transmission and a SD slot for accessing SD memory card are also configured on the side of the main control board 2.

Figure 3:
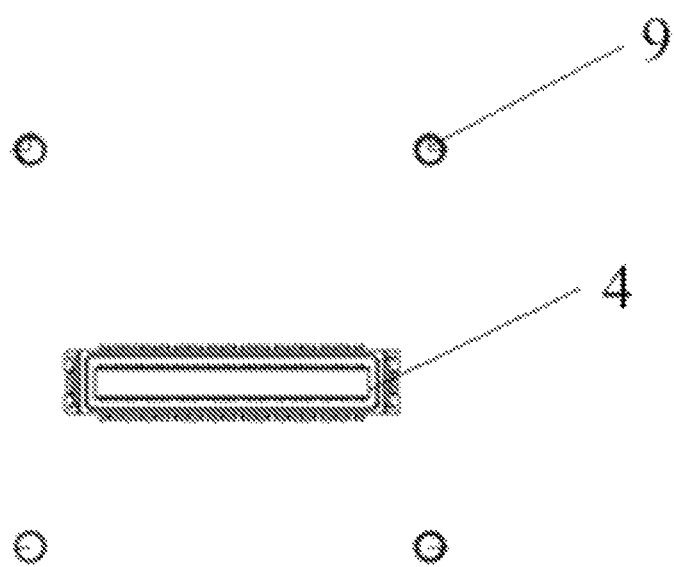
FIG. 3 is a schematic diagram of one surface of the communication port device.

As shown in FIG. 3, this invention provides a communication port device for mounting on the drone flight controller. The communication port device is a data connector 4, and the data connector 4 is preferably a DF17 connector. The DF17 connector is configured with screw holes 9 and screws that match the screw holes. The DF17 connector is secured to the drone using the screws and the screw holes (specifically, such as drone rack, shell and other mechanical structures), so as to ensure tightly integration with the mechanical structure of the drone. Furthermore, one end of the DF17 connector is connected to the main control board, and the other end is connected to the carrier board. Other compatible connectors known by those of ordinary skill in the art can also be adopted on the data connector 4.

To enable a drone flight controller to receive or deliver information, a conventional drone flight controller needs to be configured with a variety kinds of communication ports, such as JST-GH and DF13 interfaces etc., resulting in cluttered cables due to excessive external device interfaces. To solve this problem, this invention provides a communication port device that integrates all interfaces connecting external devices. This invention is realized by integration of all interfaces into the DF17 connector, so the DF17 connector reduces the number of cables of the external devices connected to the drone flight controller. In this embodiment, the DF17 connector is an 80-pin connector. The greater the number of pins, the more data can be received from different protocols, thus achieving the purpose of multiple interface integration. Specifically, it can include a PWM signal input and output, a CAN bus, an I2C protocol and a serial communication protocol, etc.

During actual use, the communication port device on the drone flight controller serves as a male end, and the connection interface of an external device serves as a female end, that is, the connection interface of an external device also has to be a DF17 connector, and different external connection devices need to use a DF17 connector as the female end, so as to achieve matching with the male end mounted on the flight controller and enable data interaction. Meanwhile, the communication port device described in this invention is secured to the drone through the screw holes and screws of the DF17 connector (specifically, it can be secured to the rack or other mechanical structures of the drone), so as to improve the connection stability between the two. In this embodiment, the number of screw holes is 4, the screw holes are respectively set at the four vertices of the DF17 connector, and the four screw holes are rectangular. The evenly arranged four screw holes ensure uniform stress throughout the DF17 connector when the drone flight controller is secured to the mechanical structure of the drone, so that the service life of the DF17 connector can be improved. Meanwhile, the period of use of the communication port device is extended, thus reducing the cost of data interaction with external devices.

Another aspect of this invention also provides a drone using this flight controller. The flight controller can be detachably installed on the drone through screws. During installation, it should be noted that the control device should be installed near the center of gravity of the drone. Various electronic devices on the drone can be directly connected to the interface device 3 of the carrier board 1 of control device. At the same time, the user can select different carrier boards 1 according to the type of drone. For example, when there is no GPS device on the user's drone, a smaller carrier board 1 without a GPS interface can be selected during the selection of a carrier board 1, so as to lower the weight of the flight controller.

From the above description, it can be seen that this invention solves the problem that the drone flight control portion needs to be directly connected with the electronic components. In this way, when the user replaces or upgrades the flight controller, the user only needs to remove the main control board from the carrier board, and then install the new main control board. There is no need to unplug the cables of other electronic devices, thus saving the replacement time. This embodiment also solves the problem that the drone flight controller cannot be customized. The users can use different versions of carrier board to adapt to their drones. There are some light and small carrier boards have fewer interfaces and are suitable for users who do not require too many connections to electronic devices. Large-sized carrier boards are suitable for users who require many connections to external devices.

The above descriptions are only preferred embodiments of this invention and are not intended to limit this invention. Various modifications and changes may be made to this invention by those skilled in the art without departing from the scope of the attached claims. Any modifications, equivalent substitutions, improvements etc. within the spirit and principles of this invention shall be included in the scope of protection of this invention. Therefore, the above figures and description are illustrative in nature, and should not be construed to limit the scope of protection of the claims of this invention.

What is claimed is:

1. A control device, characterized in that it comprises
   a carrier board (1) and
   a main control board (2) that is detachably configured on the carrier board (1), said main control board (2) is electrically connected with the carrier board (1), and said carrier board (1) is configured with an interface device (3) in which connections between a plurality of kinds of external devices to be connected with the said carrier board (1);
   wherein said interface device (3) comprises:
      a bus interface,
      an output interface, and
      at least one of:
         a remote-control interface, a GPS interface, a telemetry interface, and an analog digital signal conversion interface;
   wherein said bus interface comprises at least one of:
      a CAN bus interface,
      an I2C bus interface,
      a USB interface,
      PWM interface,
      PPM interface, and
      a S.BUS interface.

2. The control device according to claim 1, characterized in that a slot is configured on said carrier board (1), and said main control board (2) is detachably configured in said slot.

3. The control device according to claim 1, characterized in that a data connector (4) is configured on said carrier board (1), a data interface is configured on a position of the main control board (2) corresponding to the data connector (4), said data connector (4) is connected to said data interface.

4. The control device according to claim 3, characterized in that said data connector (4) comprises power supply pins, so that said carrier board (1) supplies power to the main control board (2) when said data connector (4) is connected to the data interface.

5. The control device according to claim 1, characterized in that a side of said carrier board (1) is configured with at least one power supply interface (5) for connecting an external power source, such that said carrier board (1) and said main control board (2) are powered by an external power source.

6. The control device according to claim 3, characterized in that said data connector (4) is a DF17 connector, and said DF17 connector is configured with screw holes and screws that match the screw holes, said DF17 connector is secured to a drone using said screws and screw holes, one end of said DF17 connector is connected to said controller, and the other end is connected to the carrier board.

7. The control device according to claim 6, characterized in that the DF17 connector is an 80-pin connector.

8. The control device according to claim 6, characterized in that the number of said screw holes is 4, said screw holes are arranged at four vertices of said DF17 connector respectively, and said four screw holes are rectangular.

9. A drone, characterized in that said drone is configured with the control device of claim 1.

* * * * *

UNITED STATES PATENT AND TRADEMARK OFFICE
CERTIFICATE OF CORRECTION

| | | |
|---|---|---|
| PATENT NO. | : 10,613,526 B2 | Page 1 of 1 |
| APPLICATION NO. | : 16/013973 | |
| DATED | : April 7, 2020 | |
| INVENTOR(S) | : Muqing Cao and Chengjun Wu | |

It is certified that error appears in the above-identified patent and that said Letters Patent is hereby corrected as shown below:

On the Title Page

Item (72) Inventor(s) should read: Muqing Cao, Xiamen (CN); Chengjun Wu, Xiamen (CN); Philip Jonathan Rowse, Geelong (AU)

Signed and Sealed this
Second Day of May, 2023

Katherine Kelly Vidal
*Director of the United States Patent and Trademark Office*